(12) United States Patent
Brandani

(10) Patent No.: US 6,345,520 B1
(45) Date of Patent: Feb. 12, 2002

(54) DEVICE FOR TRANSFERRING DIGITAL DATA BETWEEN A ROTATING PART AND A FIXED PART OF A MACHINE, PARTICULARLY FOR HOSIERY KNITTING MACHINES AND THE LIKE

(75) Inventor: Paolo Brandani, Scandicci (IT)

(73) Assignee: Matec S.p.A., Scandicci (IT)

( * ) Notice: Subject to any disclaimer, the term of this patent is extended or adjusted under 35 U.S.C. 154(b) by 0 days.

(21) Appl. No.: 09/660,842

(22) Filed: Sep. 13, 2000

(30) Foreign Application Priority Data

Sep. 16, 1999 (IT) .......................................... MI99A1930

(51) Int. Cl.[7] .............................................. D04B 15/78
(52) U.S. Cl. ....................................................... 66/219
(58) Field of Search ........................... 66/218, 219, 232

(56) References Cited

U.S. PATENT DOCUMENTS 4,055,058 A * 10/1977 Tewsley et al. ................ 66/219
4,081,974 A * 4/1978 Jaffe et al. ..................... 66/219
5,144,818 A * 9/1992 Brandani ....................... 66/219

FOREIGN PATENT DOCUMENTS

| DE | 2205750 | * | 8/1973 | ................... 66/219 |
| DE | 2540498 | * | 3/1976 | ................... 66/219 |

* cited by examiner

Primary Examiner—Danny Worrell
(74) Attorney, Agent, or Firm—Guido Modiano; Albert Josif; Daniel O'Byrne

(57) ABSTRACT

A device for transferring digital data between a rotating part and a fixed part of a machine, particularly for hosiery knitting machines and the like, comprising a data transmission unit and a data reception unit, the data reception unit being arranged so as to face the data transmission unit, the data transmission unit and the data reception unit being arranged on two separate parts of the machine, of which one is movable and the other one is fixed.

8 Claims, 4 Drawing Sheets

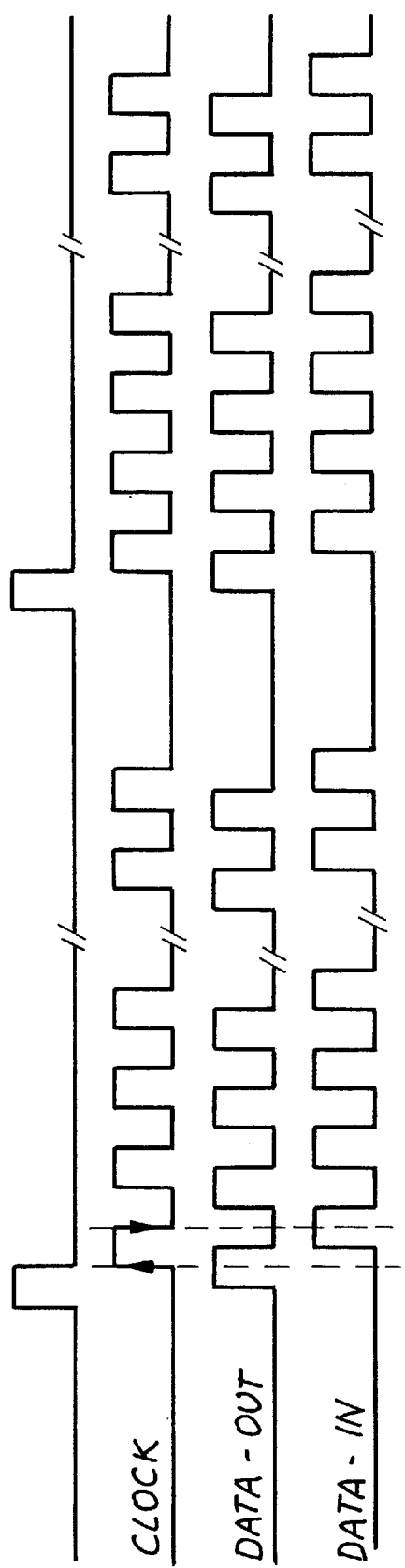

DEVICE FOR TRANSFERRING DIGITAL DATA BETWEEN A ROTATING PART AND A FIXED PART OF A MACHINE, PARTICULARLY FOR HOSIERY KNITTING MACHINES AND THE LIKE

BACKGROUND OF THE INVENTION

The present invention relates to a device for transferring digital data between a rotating part and a fixed part of a machine, particularly for hosiery knitting machines and the like.

It is known that the transfer of digital data from one part of a machine to another can occur in various manners, the simplest being provided by a wired connection. However, this solution can entail considerable drawbacks if the transfer of digital data has to occur between a rotating part and a fixed part of the machine. In this case, the wired connection does not allow complete freedom of rotation of the rotating part with respect to the fixed part and is therefore not suitable for this type of machine.

There are also systems for transferring digital data between a rotating part and a fixed part which use sliding contacts and in which therefore there is a true physical contact between the rotating part and the fixed part. This solution, as mentioned earlier for the wired connection (which also provides, in any case, a physical connection between the rotating part and the fixed part), entails a drawback due to mechanical wear of the system, which leads to a reduced life of the device and to the generation of false contacts which impair the transmission of digital data between one portion and the other of the machine.

Optical devices are also available for transmitting digital data between two parts of a machine, but they can transmit data only when the transmitter and the receiver face each other, and therefore this entails a very small data transmission window with respect to the period, for example, of rotation of the rotating part of the machine.

SUMMARY OF THE INVENTION

The aim of the present invention is to provide a device for transferring digital data between a rotating part and a fixed part of a machine, particularly for hosiery knitting machines and the like, which allows, without physical contact between the transmitter and the receiver, to transfer digital data with a transfer which can occur throughout the path of rotation of the rotating part of the machine.

Within the scope of this aim, an object of the present invention is to provide a device for transferring digital data between a rotating part and a fixed part of a machine which allows to avoid false contacts and therefore an incorrect data transfer.

Another object of the present invention is to provide a device for transferring digital data between a rotating part and a fixed part of a machine in which the life of the device is considerably extended with respect to conventional devices, which are limited by mechanical wear.

Another object of the present invention is to provide a device for transferring digital data between a rotating part and a fixed part of a machine which is highly versatile and allows to easily swap the part meant to be rigidly coupled to the rotating part and the part that is rigidly coupled to the fixed part.

Another object of the present invention is to provide a device for transferring digital data between a rotating part and a fixed part of a machine which is highly reliable, relatively easy to manufacture and at competitive costs.

These and other object which will become better apparent hereinafter are achieved by a device for transferring digital data between a rotating part and a fixed part of a machine, particularly for hosiery knitting machines and the like, characterized in that it comprises data transmission means and data reception means, said data reception means being arranged so as to face said data transmission means, said data transmission means and said data reception means being arranged on two separate parts of said machine, of which one is movable and the other one is fixed.

BRIEF DESCRIPTION OF THE DRAWINGS

Further characteristics and advantages of the present invention will become better apparent from the following detailed description of preferred but not exclusive embodiments of the device according to the invention, illustrated only by way of non-limitative example in the accompanying drawings, wherein:

FIG. 7 is a timing chart which plots the signals in the device according to the present invention, shown in particular in FIG. 6.

DESCRIPTION OF THE PREFERRED EMBODIMENTS

Figure 1:
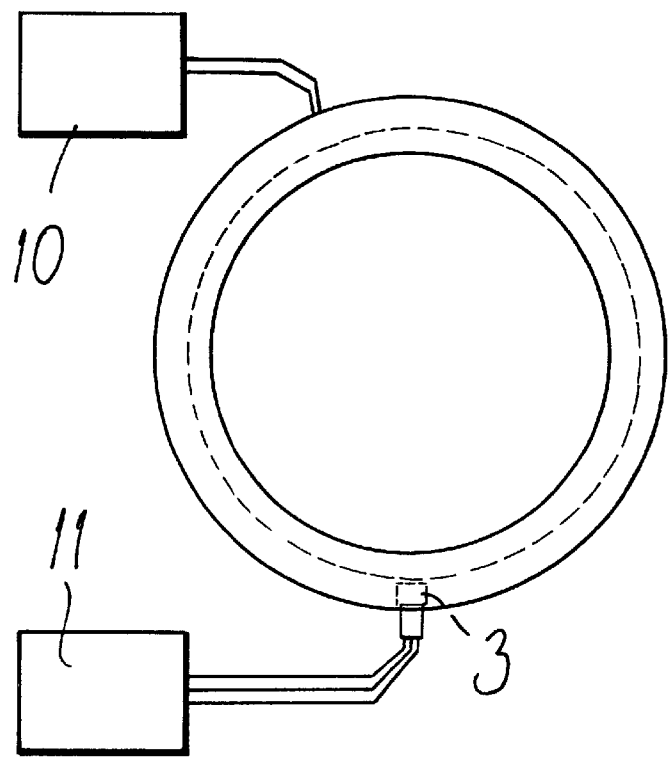
FIG. 1 is a plan view of the device according to the present invention, in a first embodiment.

With reference to the above-cited figures, the digital data transfer device according to the present invention is provided by means of a coil 1 which is accommodated in a ferromagnetic core 2. The coil represents the digital data transmitter, and sensor means 3, conveniently constituted for example by a Hall-effect sensor, are arranged so as to face the coil and are inserted between flux concentrators 4.

The coil 1 and the sensor 3 can alternatively be arranged so that one is on a fixed part of a machine and the other one is on a rotating part thereof. In particular, it is possible to arrange the coil 1 on the fixed part so that the sensor 3 rotates rigidly with the rotating part of the machine, or vice versa.

The shape of the coil, which is circular, allows to maintain coupling between the sensor 3 and the coil 1 throughout rotation rather than over only a portion of a turn as occurs in conventional optical systems.

Figure 2:
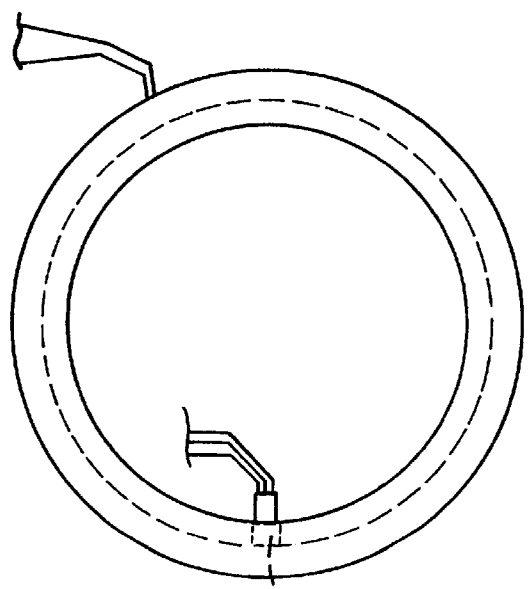
FIG. 2 is a plan view of the device according to the invention, in a second embodiment.
Figure 3:
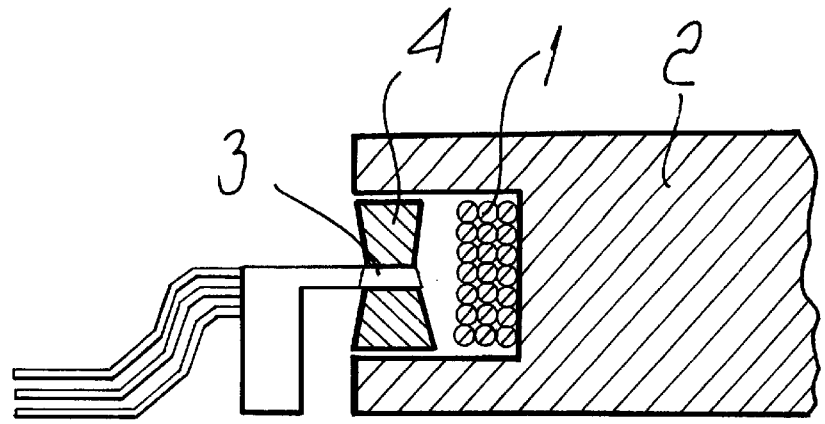
FIG. 3 is a transverse sectional view of the device according to the invention.

In particular, the sensor 3 can be arranged on the external tangent of the coil 1, as shown in FIG. 1, on the internal tangent of the coil 1, as shown in FIG. 2, or at the axis of the coil 1, depending on the intended applications.

The device operates even if the transmitter part (coil 1) and the receiver part (sensor 3) are both motionless.

FIG. 1 illustrates the coil, which has a circular cross-section, with the sensor 3 and electronic means for controlling and regulating the current 10, which are adapted to send a current signal to the coil, and electronic digitizing means which digitize the signal acquired by the sensor 3.

In practice, a digital signal of high logic level generates, for example, a positive current in the coil 1, while a digital signal of low logic level generates a negative current. The consequent positive or negative flux generated inside the coil 1 is detected by the sensor 3, which increases or decreases its output voltage.

For the transfer of digital data, i.e., for each digital data item (for each data channel), it is therefore necessary to provide a coil 1 and a corresponding sensor 3.

Figure 4:
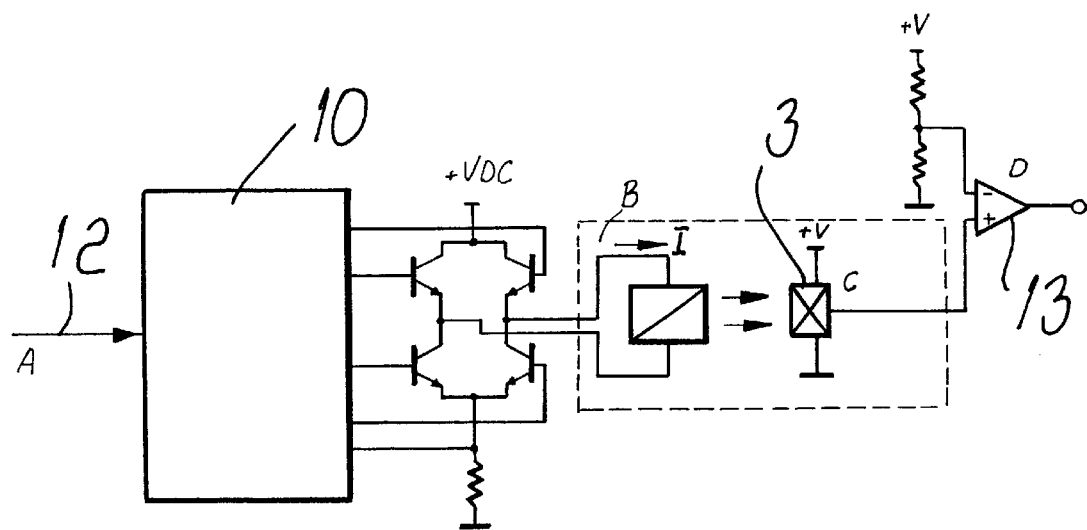
FIG. 4 is a circuit diagram of the device according to the present invention.

FIG. 4 illustrates an example of circuit diagram in which a digital signal 11 is fed into the current control and adjustment means 10, which feed the coil 1, by means of a current I, and the coupling with the sensor 3 provides in output a voltage signal which is then digitized by the electronic digitizing circuit 13 in order to have in output the digitized data item that corresponds to the input data item.

Figure 5:
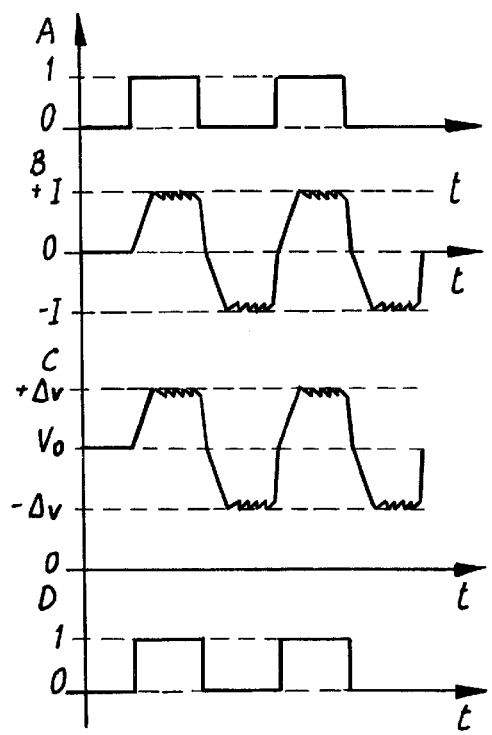
FIG. 5 shows charts which plot the signals in the device according to the present invention.

FIG. 5 plots the waveforms of the data of the circuit of FIG. 4. In particular, the chart designated by A corresponds to the logic signal 12 fed into the current control and adjustment means 10.

The chart designated by B plots the current that flows in the coil as a function of the time t (current I).

The chart designated by C instead plots the output voltage of the sensor 3 as a function of time, and the chart designated by D plots the data item in output from the digitizing means 13.

The references A to D are also shown in FIG. 4, at the positions in which the signals subsequently plotted in FIG. 5 are read.

Figure 6:
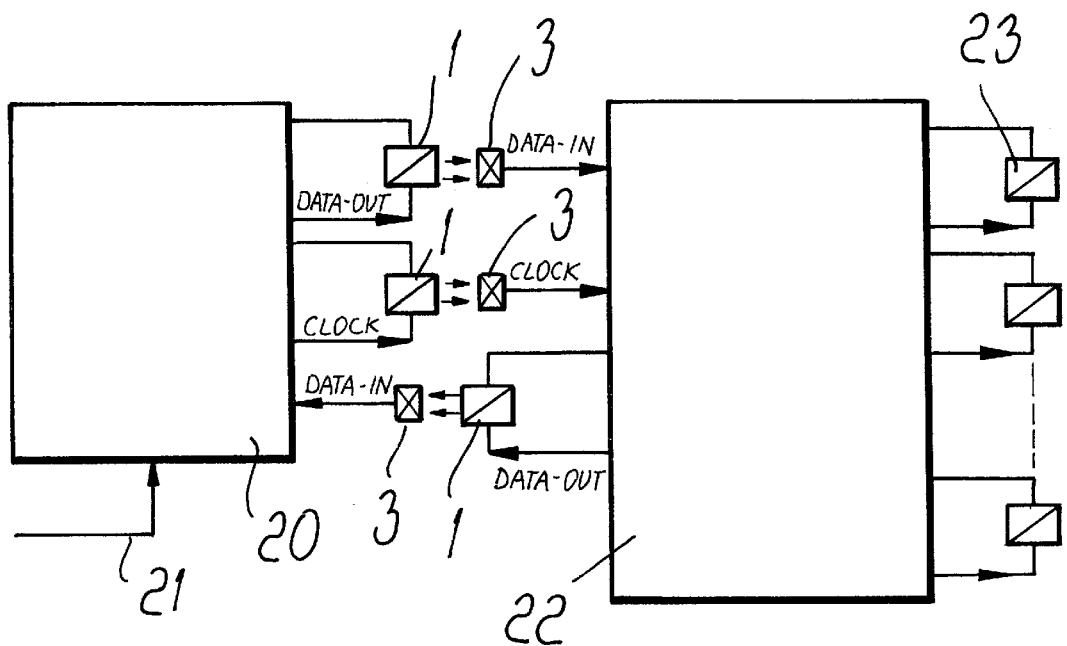
FIG. 6 is a block diagram of the device according to the present invention.

FIG. 6 illustrates an example of application of the digital data transfer device according to the invention, in which an electronic unit 20 is arranged on the fixed part of a machine, for example, a hosiery knitting machine or the like, and is driven by a synchronization signal 21 which is generated for example by counting the pulses of an encoder. The electronic unit 20 transfers, as a consequence of said synchronization signal 21, a packet of data to an electronic unit 22 which is arranged on the moving part of the machine.

The packet of data consists of data which represent, with an appropriate encoding, commands toward electromechanical actuators 23 which are arranged on the moving part of the machine.

The data are encoded and transmitted serially, in a synchronous mode, and require only two channels with electromagnetic couplings, DATA-OUT and CLOCK.

The electronic unit 22 on the moving part of the machine receives serial data, decodes them, interprets them and actuates the electromechanical actuators 23 accordingly.

The data in input in the electronic unit 22 are designated by data-in and clock.

In turn, the electronic unit 22 replies with a packet of data which represent the result of a series of diagnostic activities. These data, too, are transmitted serially on a single channel with electromagnetic coupling and in this case the sensor is on the fixed part of the machine, while the coil is on the moving part of the machine.

In the preceding case, the transfer of the data packet of the electronic unit 20 to the unit 22 occurred serially, the coil being arranged at the fixed part and designated by the reference numeral 1, also used in the preceding figures, the sensor being designated by the reference numeral 3.

FIG. 7 plots a typical timing chart for the transfer of data of the block diagram of FIG. 6.

In practice it has been observed that the digital data transfer device according to the present invention fully achieves the intended aim and objects, since it allows to perform a data transfer without physical coupling between the transmitter and the receiver, and most of all with the possibility of transfer throughout the rotation of the moving part with respect to the fixed part.

The device thus conceived is susceptible of numerous modifications and variations, all of which are within the scope of the inventive concept; all the details may furthermore be replaced with technically equivalent elements.

In practice, the materials used, so long as they are compatible with the specific use, as well as the dimensions, may be any according to requirements and to the state of the art.

The disclosures in Italian Patent Application No. MI99A001930 from which this application claims priority are incorporated herein by reference.

What is claimed is:

1. A device for transferring digital data between a rotating part and a fixed part of a machine, comprising data transmission means and data reception means, said data reception means being arranged so as to face said data transmission means, said data transmission means and said data reception means being each respectively arranged on a movable part and on a fixed part of said machine, to establish a bidirectional communication between said movable and fixed parts of the machine.

2. The device according to claim 1, wherein said data transmission means comprise a coil which is faced by said data reception means, which are constituted by sensor means.

3. The device according to claim 2, wherein said sensor means comprise a Hall sensor.

4. The device according to claim 1, wherein said data reception means are arranged at a tangent of said transmission means constituted by said coil.

5. The device according to claim 1, wherein the coupling between said data transmission means and said data reception means, provided by means of the mutually facing arrangement of said transmission means and of said reception means, occurs throughout the path of rotation of said moving part of the machine with respect to said fixed part.

6. The device according to claim 1, wherein said machine is a hoisery machine.

7. The device according to claim 1, wherein said machine is a knitting machine.

8. The device according to claim 1, wherein data bidirectionally exchanged between said data transmission means and said data reception means are exchanged in synchronous mode with one channel for the data and one channel for the synchronization signal.

* * * * *